United States Patent

[11] 3,562,559

[72] Inventor Aldoph Karl Rapp
Princeton, N.J.
[21] Appl. No. 686,411
[22] Filed Nov. 29, 1967
[45] Patented Feb. 9, 1971
[73] Assignee RCA Corporation
a corporation of Delaware

[54] P-MOS MULTIVIBRATOR
6 Claims, 4 Drawing Figs.

[52] U.S. Cl. .......... 307/279, 307/273, 331/113
[51] Int. Cl. .......... H03k 3/26
[50] Field of Search .......... 307/279, 273, 304; 328/207; 331/108, 113, 135

[56] References Cited
UNITED STATES PATENTS
2,531,446 11/1950 Levy .......... 328/207X OTHER REFERENCES
ELECTRONICS, APRIL 3, 1967 P— 98 (Copy enclosed) " Multivibrators provides short pulses" by PFEIFFER
ELECTRONIC DESIGN OCT. 1955 PP— 42— 44 (Copy enclosed) " Field Effect Transistor Circuit Design" by Huang et al.
AMELCO SEMICONDUCTOR NOTES JUNE, 1962, PP 5— 6 (Copy enclosed) " FIELD EFFECT TRANSISTORS NOTES"

*Primary Examiner*—John S. Heyman
*Attorney*—H. Christoffersen

ABSTRACT: A multivibrator circuit in either monostable or astable form using transistors of similar conductivity types, which circuit lends itself to be manufactured in integrated form. The entire multivibrator can be fabricated using only insulated-gate field-effect transistors of one conductivity type.

INVENTOR
A. Karl Rapp
BY H. Christoffersen
ATTORNEY

P-MOS MULTIVIBRATOR

BACKGROUND OF THE INVENTION

Monostable and astable multivibrator circuits are widely used in electronic systems. For example, monostable types are used for signal delay, producing shaped pulses, etc., while astable types are used for oscillators. The recent interest in manufacturing circuits in integrated form has increased the desirability of designing circuits for integration. However, in order to obtain the benefits of integrated circuit manufacture, the circuits should have low power dissipation, especially in a steady state condition, to prevent overheating of the miniature circuit. Further, the number of different types of circuit components should be minimized in order to simplify the processing steps in manufacturing of the integrated circuits which steps are directly related to the cost of final product. Accordingly, the present invention is directed to a multivibrator circuit suitable for integration, having low power dissipation and being constructed entirely of a single-conductivity type transistor.

BRIEF SUMMARY OF THE INVENTION

The present invention is directed to a multivibrator circuit using transistors of similar conductivity type and particularly insulated-gate field-effect transistors, wherein some of the transistors function as load resistors while others perform gating functions. The input electrode capacitance of the transistors and stray circuit capacitance are used as a time-constant capacitor for the circuit. The basic circuit is arranged to operate as a monostable multivibrator. An astable multivibrator configuration is achieved by using two of the monostable circuits in a loop feedback configuration wherein the output signal from one circuit is used as the input signal for the other. An output signal width control function is introduced by means of an external voltage applied to one of the transistors functioning as a resistor in a timing circuit.

DETAILED DESCRIPTION OF THE INVENTION

An insulated-gate field-effect transistor (IGFET) has characteristics which make it particularly suitable for the multivibrator circuits embodying the present invention. Accordingly, the circuits are illustrated, by way of example, with the use of such transistors. An IGFET may be defined as a majority carrier field-effect device having a body of semiconductive material with source and drain connections thereon. These connections are spaced apart and define the ends of a current conductive channel through the body. A gate electrode is arranged to overlie this channel and is separated from the body by an insulating layer. Since the gate is insulated from the semiconductive material, it draws no appreciable current and exhibits a voltage compatibility which allows the drain of one IGFET to be directly connected to the gate of another. Moreover, the high gate capacity of the IGFET may aid in providing the timing capacitance in a multivibrator circuit.

Two examples of IGFET's are the thin-film transistor (TFT) and the metal-oxide-semiconductor (MOS). The former is described in an article by Paul K. Weimer, entitled "The TFT–A New Thin Film Transistor," appearing at pages 1462—1469 of the June, 1962 issue of the PROCEEDINGS OF THE IRE. The latter device is described in an article entitled "The Silicon Insulated-Gate Field-Effect Transistor" by S. R. Hofstein and F. P. Heiman, appearing at pages 1190—1202 of the Sept. 1963 issue of the PROCEEDINGS OF THE IEEE.

The IGFET's to be usedin the illustrated circuits of the present invention are of the so-called enhancement type. In this type, only a negligible leakage current flows between the source and drain when the voltages at the gate and source are equal to each other. In the P-type transistor, current flows between the source and drain when gate voltage is changed in a negative direction after the gate-source threshold level is exceeded.

Figure 1:
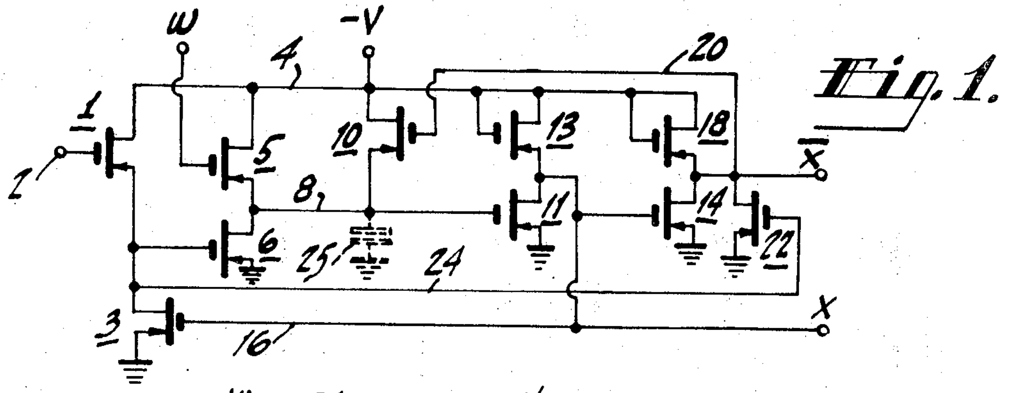
FIG. 1 is a schematic diagram of a monostable multivibrator using a first embodiment of the present invention.

The monostable circuit illustrated in FIG. 1 includes ten P-type transistors. Each transistor is shown with a source, drain and gate electrode which correspond, respectively, to the emitter, collector and base electrodes of a bipolar transistor. The source electrode is shown as being located on the same side of the device as the drain electrode and is distinguished therefrom by an arrowhead thereon poled in the direction of conventional current flow. A first transistor 1 has its gate connected to an input terminal 2. The source of the first transistor 1 is connected to the drain of a second transistor 3. The source of the second transistor 3 is connected to circuit ground. The drain of the first transistor 1 is connected to a bus line 4 maintained at −V volts. A third transistor 5 also has its drain connected to the bus 4 and its source connected to the drain of a fourth transistor 6. The gate of the third transistor 5 is connected to a width control terminal W. The source of the fourth transistor 6 is connected to circuit ground while its gate is connected to the drain of the second transistor 3. The drain of the fourth transistor 6 is connected to the source of a fifth transistor 10 and the gate of a sixth transistor 11. The drain of the fifth transistor 10 is connected to the first bus 4. The source of the sixth transistor 11 is connected to circuit ground while its drain is connected to the source of a seventh transistor 13. The gate and drain of the seventh transistor 13 are connected to the bus 4. The drain of the sixth transistor 11 is also connected to the gate of an eighth transistor 14, the gate of the second transistor 3 along a first feedback line 16 and to a first output terminal X. The source of the eighth transistor 14 is connected to circuit ground while its drain is connected to the source of a ninth transistor 18. The gate and drain of the ninth transistor 18 are connected to the first bus 4. The drain of the eighth transistor 14 is also connected to a second output terminal $\overline{X}$, a second feedback line 20, and the drain of a tenth transistor 22. The second feedback line 20 is connected to the gate of the fifth transistor 10. The source of the tenth transistor 22 is connected to circuit ground while its gate is connected by a feed forward line 24 to the drain of the second transistor 3.

As previously mentioned, an IGFET, especially an MOS transistor, has a relatively high input, or gate, capacitance, which capacitance may function as the time-constant-determining capacitance in the circuit. In FIG. 1, the input or gate capacitance of transistor 11 is employed for this purpose. This input capacitance is further augmented by the capacitance to ground of the source electrodes of transistors 5 and 10 and the drain capacitance of transistor 6, as well as by the stray capacitance in interconnecting leads. This total capacitance is represented in the drawing by the capacitor 25 shown in dashed line form. For additional capacitance, an external capacitor may be connected in parallel with capacitor 25.

The operation of the circuit of FIG. 1 is divided between a quiescent, or stable, state and an operating, or quasistable, state following the receipt of an input signal. It is to be noted that some of the transistors in the circuit function as resistors in which the conductivity of the conducting channel in the transistor, i.e., the resistance thereof, is a function of the fixed voltage applied at the gate, and any value of resistance within limits may be achieved by the proper selection of the applied voltage. The use of a transistor as a resistor renders the overall circuit easily integratable since the entire circuit consists of transistors. If this voltage is made variable, the transistor "resistance" may be varied and the effect is variable output signal developed from the circuit having the variable "resistance." The conductance of the transistors is selected to provide proper circuit operation and may be as follows. The second, fourth, fifth, sixth, eighth, and tenth transistors 3, 6, 10, 11, 14 and 22 are arranged to have a high relative conductance, e.g., twenty, based on a unit conductance for each of the remaining transistors.

During the absence of an input signal (input = 0 volts), there is a signal level of −V on the X̄ output terminal (representing a "one" level) hereinafter referred to as a high level, and a signal level of substantially zero volts on the X output terminal (representing a "zero" level) hereinafter referred to as a low level. This state is achieved by having the first transistor 1 function as a source-follower to transmit the level at its gate, minus a threshold voltage drop, to the source of the transistor 1, which is connected to the gate of the fourth transistor 6. This input level to the transistor 6 biases this transistor in a high impedance, or "off," state.

The third transistor 5 is operated as a load resistor under the control of an external voltage applied to the W terminal. The "off" state of the fourth transistor 6 biases the sixth transistor 11 into an "on" state by the voltage applied through load transistor 5, while the seventh transistor 13 is operated as a load resistor by means of the applied constant gate voltage from the bus 4. The "on" state of the sixth transistor 11, similarly, biases the eighth transistor 14 into an "off" state, with the ninth transistor 18 functioning as a load resistor to supply approximately −V volts at output terminal X̄ from bus 4. This voltage level is, also, applied over feedback line 20 to place the fifth transistor 10 in an "on" state. The conductive state of this transistor insures that the capacitor 25 is charged substantially to the −V level on the bus 4. The "on" state of the sixth transistor 11, on the other hand, produces ground, or zero, potential on the output terminal X and is applied over feedback line 16 to bias the second transistor 3 into the "off" state.

When an input signal level (−V) is applied to terminal 2, the first transistor 1 acts as a source follower to apply this negative signal to the gate of the fourth transistor 6 and, over the feed-forward line 24, to the gate of the tenth transistor 22. This input signal level places the tenth transistor 22 into a conducting state which pulls the output signal level on terminal X̄ to a "zero," or ground, level and, concurrently, turns off the fifth transistor 10. The input signal also biases "on" fourth transistor 6, and since the fourth transistor 6 is a high conductance transistor, the capacitor 25 is discharged rapidly. Additionally, sixth transistor 11 is biased into an "off" state which brings the output level on the output terminal X to approximately the −V, or "one," level. This voltage biases the eighth transistor 14 into a conducting state, which holds the output level on terminal X̄ at "zero." It further biases the second transistor 3 into a conducting state, which in turn, biases the fourth transistor 6 and the tenth transistor 22 into the "off" state. The capacitor 25 then charges toward the −V volt level on bus 4 at a rate dependent on the effective impedance of the third transistor 5, which is controlled by the width-control voltage applied to the terminal W.

When the voltage on the capacitor 25 exceeds the turn-on threshold voltage of the sixth transistor 11, this transistor begins to conduct. As a result, the drain voltage of the sixth transistor 11 starts to drop toward zero, which is effective to begin a turnoff of the eighth transistor 14. During this turnoff, the drain voltage of transistor 14 begins to fall and biases "on" the high-conductance fifth transistor 10, to aid in the charging of the capacitor 25. This regenerative process quickly reestablishes the aforesaid quiescent, or stable, state of the circuit wherein the output on terminal X̄ is a −V, or "one," level and the output on the terminal X is a ground, or "zero" level. Subsequent input pulses on the input terminal 2 result in a repetition of the aforesaid sequence whereby a signal pulse is produced on each of the two output terminals X and X̄ having a width, or duration, which is controlled by the level of the voltage applied to the width control terminal W.

Figures 2, 3:
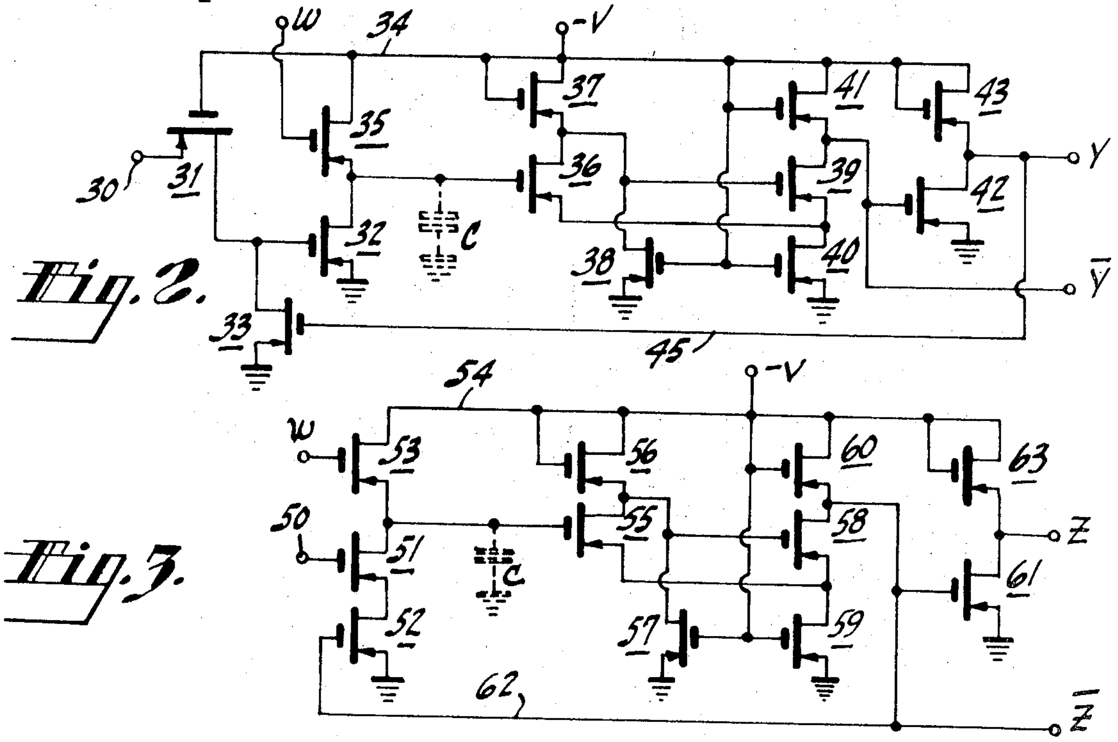
FIG. 2 is a schematic illustration of a monostable multivibrator using a second embodiment of the present invention.
FIG. 3 is a schematic diagram of a monostable multivibrator using a third embodiment of the present invention.

In FIG. 2, there is shown another embodiment of the present invention. An input terminal 30 is connected to the drain terminal of a first transistor 31. The source of the first transistor 31 is connected to the gate of a second transistor 32 and to the drain of a third transistor 33. The gate of the first transistor 31 is connected to a bus 34, which is connected to power supply −V. The source of the second transistor 32 is grounded while the drain thereof is connected to the source of a fourth transistor 35. The drain of the fourth transistor 35 is connected to the bus 34 while the gate thereof is connected to a width control signal terminal W.

The source of the fourth transistor 35 is also connected to the gate of a fifth transistor 36. The drain of the fifth transistor 36 is connected to the source of a sixth transistor 37 having its gate and drain connected to the bus 34. The source of the sixth transistor 37 is also connected to the drain of a seventh transistor 38 and to the gate of an eighth transistor 39. The source of the fifth transistor 36 is connected to the source of the eighth transistor 39 which is also connected to the drain of a ninth transistor 40. The source of the ninth transistor 40 is grounded while the gates of the seventh and ninth transistors 38 and 40 are connected to the bus 34.

The drain of the eighth transistor 39 is connected to the source of a tenth transistor 41 which has its gate and drain connected to the bus 34. The drain of the eighth transistor 39 is also connected to the gate of an eleventh transistor 42 having its source grounded and its drain connected to the source of a twelfth transistor 43. The drain and gate of the twelfth transistor 43 are connected to the bus 34. The gate of the eleventh transistor 42 is also connected to a first output terminal Ȳ. The source of the twelfth transistor 43 is connected to a second output terminal Y and to a feedback line 45 which is connected to the gate of the third transistor 33.

In operation, the circuit shown in FIG. 2 operates in a manner analogous to that described above with respect to the circuit shown in FIG. 1. The transistors 31, 35, 37, 38, 40, 41 and 43 function as resistive elements in a manner as described above for FIG. 1. The timing capacitance is shown in dashed-line form as a capacitor C connected to the gate of the transistor 36. In an initial steady, or stable, state, i.e., when there is an absence of an input signal as represented by the input terminal 30 being at approximately zero volts, the output signal on the second output terminal Y is at ground, or zero, volts and the output signal on terminal Ȳ is at approximately −V volts. In this state, the capacitor C is charged to a negative voltage which is equal to the control voltage level W minus the threshold voltage drop of transistor 35. This capacitor voltage is used as an input signal to the gate of the transistor 36 which is used in a so-called Schmitt-trigger circuit in combination with the transistor 39. This input signal to the gate of the transistor 36 biases this transistor into an "on" state.

The transistors 37 and 38 are operated as series resistors connected between the bus 34 and ground to form a voltage divider for the voltage level −V on bus 34. The voltage level appearing at the junction of the transistors 37 and 38 is applied to the gate of the transistor 39. During the "on" state of the transistor 36, this gate signal for the transistor 39 is a low level signal which is arranged to bias the transistor 39 into the "off" state. At this time the voltage at the drain of transistor 39 is a high level, i.e., near −V, which biases transistor 42 into a conducting state. The drain of the transistor 42 is, thus, a low level, i.e., near ground, signal which is applied to the output terminal Y and to the gate of transistor 33 to bias that transistor "off." The high level gate voltage for the transistor 42 is applied to the output terminal Ȳ.

When an input signal having a negative level −V is applied to the input terminal 30, the transistor 32 is biased into a conducting state and discharges the timing capacitor C. This change in the input signal to the transistor 36 changes the state of the Schmitt-trigger circuit. Specifically, the decrease in the input signal level at the gate of the transistor 36 due to the discharging of the capacitor C decreases the current through the transistor 36. This decrease in current is effective to increase the signal level at the gate of the transistor 39 toward the −V level. The new signal level at the gate of the transistor 39 places it in a conducting state. Finally, the Schmitt-trigger circuit is established in the reverse state with transistor 39 conducting and transistor 36 in an "off" state.

The conducting state of the transistor 39 is effective to bring the signal level applied to the gate of the transistor 42 to a low level to place transistor 42 in a nonconducting state. At this time, the signal on terminal Y is a high level and that on terminal $\overline{Y}$ is a low level signal. The high level signal from the terminal Y is applied over line 45 to the gate of transistor 33 to turn it "on." Since transistor 31 is effectively a resistor, the conducting state of transistor 33 pulls the gate input level of transistor 32 to a low level which turns "off" transistor 32. Since the input signal now is effectively bypassed to ground by the conducting state of the transistor 33, the operation of the circuit is independent of the pulse width of the input signal, which may continue beyond the time of initiation of conduction of the transistor 33. Thus, the circuit "differentiates" the input signal to remove the effect of input pulse width.

The "off" state of transistor 32 allows the capacitor C to charge toward the −V level on bus 34 through the transistor 35 at a rate dependent on the control level W. When the voltage level on the capacitor C exceeds the threshold of the transistor 36, a current flow is started through the transistor 36, and the Schmitt circuit quickly returns to its original state through a reversal of the action previously described. This action of the Schmitt circuit is operative to restore a high level signal on terminal $\overline{Y}$ and a low level signal on terminal Y. The low level signal turns "off" the transistor 33 to prepare the circuit for another input signal on terminal 30. Thus, the output signal is a pulse having a width dependent on the voltage level on control terminal W.

In FIG. 3, there is shown another embodiment of the present invention. An input terminal 50 is connected to the gate of a first transistor 51. The source of the first transistor 51 is connected to the drain of a second transistor 52 which has its source grounded. The drain of the first transistor 51 is connected to the source of a third transistor 53. The gate of the third transistor 53 is connected to a control input terminal W while its drain is connected to a bus 54. The bus 54 is connected to a source of a −V level. The drain of the first transistor 51 is also connected to the gate of a fourth transistor 55. The drain of the fourth transistor 55 is connected to the source of a fifth transistor 56 having its gate and drain connected to the bus 54.

The drain of the fourth transistor 55 is also connected to the drain of a sixth transistor 57 and to the gate of a seventh transistor 58. The source of the fourth transistor 55 is connected to the source of the seventh transistor 58, which is connected to the drain of an eighth transistor 59. The sources of the sixth and eighth transistors 57 and 59 are grounded while the gates thereof are connected to the bus 54. The drain of the seventh transistor 58 is connected to the source of a ninth transistor 60 having its gate and drain connected to the bus 54. The drain of the seventh transistor 58 is also connected to the gate of a tenth transistor 61 and to a feedback line 62. The feedback line 62 is connected to a first output terminal $\overline{Z}$ and to the gate of the second transistor 52. The drain of the tenth transistor 61 is connected to the source of an eleventh transistor 63 and to a second output terminal Z. The gate and drain of the eleventh transistor 63 are connected to the bus 54.

In operation, the circuit shown in FIG. 3 behaves in a manner similar to that described above for the circuit of FIG. 2 with the exception of the operation of the input circuit including transistors 51 and 52 and the feedback line 62. The transistors 51 and 52 form a two-input NAND gate for −V level signals. The input signal for the gate of the transistor 52 is taken from the normally high level output terminal $\overline{Z}$ which is the result of a circuit operation as previously described for the steady state of the circuit of FIG. 2. This high level signal biases the transistor 52 into a conducting state while awaiting the biasing of transistor 51 into a conducting state by a suitable input signal on terminal 50. This input signal "opens" the NAND gate to discharge the capacitor C. As previously described, the Schmitt circuit now switches operating states, and the output levels on terminals Z and $\overline{Z}$ reverse. The low level signal now appearing on terminal $\overline{Z}$ turns "off" the transistor 52, which closes the NAND gate to allow the recharging of the capacitor C. Thus, the input signal is "differentiated" by the circuit of FIG. 3. The further operation of the circuit of FIG. 3 is a repetition of the previously described operation of FIG. 2 following a recharging of the capacitor C, i.e., the Schmitt circuit returns to its steady state, and the output signal levels are reversed to terminate the output pulse, which has a width controlled by the control level applied to the terminal W.

Figure 4:
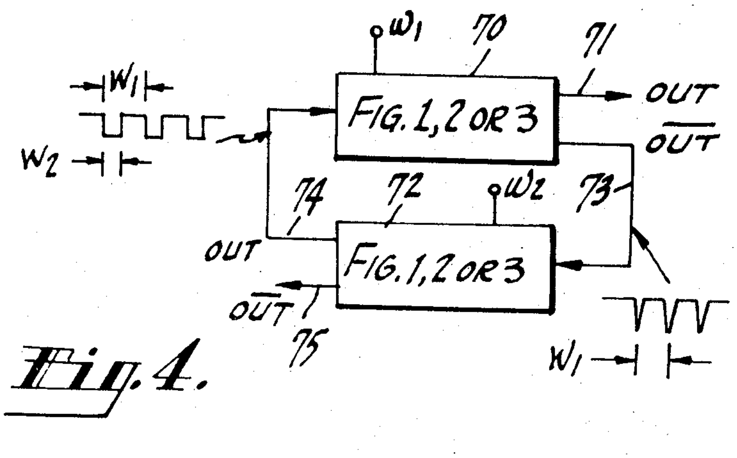
FIG. 4 is a block diagram of an astable multivibrator using the circuit shown in one of the foregoing FIGS.

In FIG. 4, there is shown an astable multivibrator circuit using two of the circuits shown in FIG. 1, FIG. 2, or FIG. 3. The output of one of the circuits used in the multivibrator is used as the input of the other circuit to alternately trigger each of the circuits into the previously described cycle. For example, using the circuit of FIG. 2 for each of the two circuits forming the multivibrator of FIG. 4, the first circuit 70 has its Y output connected to a first output line 71. The $\overline{Y}$ output is connected to the input of the second circuit 72 by a second output line 73. The Y output of the second circuit 72 is connected by a first output line 74 to the input of the first circuit while the $\overline{Y}$ output of the second circuit 72 is connected to a second output line 75. The waveshapes on the interconnecting lines 73 and 74 between the first and second circuits 70 and 72 are shown in the waveshapes adjacent to these lines in FIG. 4. The width control voltages are applied to control terminals W1 and W2 on the first and second circuits 70 and 72, respectively, to control the durations of the output signals thereof.

I claim:

1. A multivibrator circuit comprising a plurality of field-effect transistors of the same conductivity type, each such transistor having a source electrode, a drain electrode and a conduction path extending between these electrodes, and having also a gate electrode to which a voltage may be applied for controlling the impedance of said path, an input circuit including at least one of said transistors, an output circuit including at least another one of said transistors, a timing circuit including a charge storage means, at least still another one of said transistors, the conduction path of which serves as a charging path for said charge storage means, and means for applying a voltage to the gate electrode of said last-named transistor to control the rate of current flow to said charge storage means via said charging path to in turn control the time said output circuit is in the first operating state, and at least yet another one of said transistors the conduction path of which serves as a discharge path for said charge storage means in response to a signal from said input circuit being applied to the gate electrode of said last-named transistor and responsive to a signal from said output circuit applied to said gate electrode for effectively opening said discharge path.

2. A multivibrator circuit as set forth in claim 1, wherein said output circuit includes a Schmitt-trigger circuit arranged to be biased by a stored voltage on said capacitor and a feedback circuit connected between an output of said trigger circuit and said further one of said transistors.

3. A multivibrator circuit as set forth in claim 1, wherein said input circuit includes a two-input NAND gate having one input connected to a source of an input signal to said multivibrator and a second input connected to said output signal from said output circuit.

4. A multivibrator circuit as set forth in claim 1, wherein said output circuit has a pair of complementary output signals and including a second plurality of one conductivity type field-effect transistors, a second input circuit including at least one of said transistors of said second plurality, a second output circuit including at least another one of said transistors of said second plurality, said last-mentioned output circuit having a pair of complementary output signals, a second timing circuit including at least still another one of said transistors of said second plurality and operative to bias said second output circuit between stable operating states in response to output signals from said second input circuit and said second output circuit, first circuit means connecting one of said complementary output signals from said first-mentioned output circuit as an input signal for said second input circuit and second circuit means connecting an output signal from said second output circuit as an input signal to said first-mentioned input circuit wherein said last-mentioned output signal is the complement of that applied by said first circuit means.

5. A multivibrator circuit as set forth in claim 1 wherein said field-effect transistors are all P-type transistors.

6. The combination claimed in claim 1 wherein said charge storage means includes distributed capacitance means.